(12) United States Patent
Hall et al.

(10) Patent No.: US 11,924,035 B2
(45) Date of Patent: *Mar. 5, 2024

(54) SYSTEMS AND METHODS FOR CONTINUOUS CONFIGURATION DEPLOYMENT

(71) Applicant: Palantir Technologies Inc., Palo Alto, CA (US)

(72) Inventors: Nicholas Hall, Mclean, VA (US); Hamza Muraj, Austin, TX (US); Jason Free, Sanford, NC (US); John Montgomery, Arlington, VA (US); James Schweiger, Palo Alto, CA (US); Matthew Levan, Arlington, VA (US); Thomas Montague, Washington, DC (US)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/863,352

(22) Filed: Jul. 12, 2022

(65) Prior Publication Data

US 2022/0353136 A1    Nov. 3, 2022

Related U.S. Application Data

(63) Continuation of application No. 17/013,500, filed on Sep. 4, 2020, now Pat. No. 11,398,949, which is a
(Continued)

(51) Int. Cl.
*H04L 41/082* (2022.01)
*G06F 8/65* (2018.01)
(Continued)

(52) U.S. Cl.
CPC .............. *H04L 41/082* (2013.01); *G06F 8/65* (2013.01); *G06F 9/44505* (2013.01);
(Continued)

(58) Field of Classification Search
CPC ..... H04L 41/08; H04L 41/085; H04L 41/082; H04L 41/0859; H04L 67/34; H04L 67/62; G06F 8/65; G06F 9/44505
See application file for complete search history.

(56) References Cited

U.S. PATENT DOCUMENTS 5,835,911 A    11/1998 Nakagawa
6,640,278 B1 *  10/2003 Nolan ................... G06F 3/0605
                                                707/999.102

(Continued)

FOREIGN PATENT DOCUMENTS

EP    1832976 A1    9/2007

OTHER PUBLICATIONS

Extended European Search Report for EP Application 18171873.5 dated Nov. 6, 2018, 11 pages.

*Primary Examiner* — Jeong S Park
(74) *Attorney, Agent, or Firm* — Sheppard Mullin Richter & Hampton LLP

(57) ABSTRACT

Systems and methods are provided for providing continuous configuration deployment. A configuration definition object may be obtained from a remote datastore. The obtained configuration definition object may be stored in a local datastore. The configuration definition object may be obtained and stored in advance of a scheduled maintenance. The configuration definition object may be obtained in response to the configuration definition object being committed to the remote datastore. The configuration definition object may be used to generate different configuration objects. A configuration object may be generated from the
(Continued)

configuration definition object and one or more system characteristics. A service request may be received, and the configuration object may be executed to perform a configuration of a computing system.

20 Claims, 6 Drawing Sheets

Related U.S. Application Data continuation of application No. 16/361,071, filed on Mar. 21, 2019, now Pat. No. 10,771,333, which is a continuation of application No. 15/787,335, filed on Oct. 18, 2017, now Pat. No. 10,263,845.

(60) Provisional application No. 62/507,095, filed on May 16, 2017.

(51) Int. Cl.
*G06F 9/445* (2018.01)
*H04L 41/08* (2022.01)
*H04L 41/085* (2022.01)
*H04L 41/0859* (2022.01)
*H04L 67/00* (2022.01)
*H04L 67/62* (2022.01)
*G06F 8/70* (2018.01)

(52) U.S. Cl.
CPC ............ *H04L 41/08* (2013.01); *H04L 41/085* (2013.01); *H04L 41/0859* (2013.01); *H04L 67/34* (2013.01); *H04L 67/62* (2022.05); *G06F 8/70* (2013.01)

(56) References Cited

U.S. PATENT DOCUMENTS

| | | | |
|---|---|---|---|
| 6,662,221 B1 | 12/2003 | Gonda et al. | |
| 6,671,713 B2 | 12/2003 | Northrup | |
| 7,013,232 B2 | 3/2006 | Fuller, III et al. | |
| 7,526,479 B2 | 4/2009 | Zenz | |
| 7,577,661 B2 | 8/2009 | Bankston et al. | |
| 8,073,479 B2 | 12/2011 | Parkkinen et al. | |
| 9,021,470 B2 | 4/2015 | DeHaan | |
| 9,489,189 B2 | 11/2016 | Sriram et al. | |
| 9,893,940 B1 | 2/2018 | Chawla | |
| 10,237,342 B2 | 3/2019 | Ngo et al. | |
| 10,263,845 B2 * | 4/2019 | Hall | G06F 8/65 |
| 10,771,333 B2 * | 9/2020 | Hall | H04L 67/62 |
| 11,398,949 B2 * | 7/2022 | Hall | H04L 41/0859 |
| 2002/0174209 A1 * | 11/2002 | Sesek | H04L 9/40 |
| | | | 715/734 |
| 2002/0178239 A1 | 11/2002 | Kinyon | |
| 2004/0054569 A1 | 3/2004 | Pombo | |
| 2004/0088142 A1 | 5/2004 | Ashley | |
| 2005/0144610 A1 * | 6/2005 | Zenz | G06F 9/5011 |
| | | | 717/120 |
| 2005/0228769 A1 | 10/2005 | Oshima | |
| 2012/0108207 A1 | 5/2012 | Schell | |
| 2012/0197972 A1 * | 8/2012 | Tukol | G06F 9/4416 |
| | | | 709/203 |
| 2012/0221689 A1 * | 8/2012 | Qian | H04L 67/34 |
| | | | 709/220 |
| 2014/0189843 A1 | 7/2014 | Francisco | |
| 2017/0019425 A1 | 1/2017 | Ettema | |
| 2018/0309624 A1 * | 10/2018 | Hilliard | H04L 67/34 |

\* cited by examiner

SYSTEMS AND METHODS FOR CONTINUOUS CONFIGURATION DEPLOYMENT

CROSS REFERENCE TO RELATED APPLICATIONS

This application is a continuation application of U.S. Ser. No. 17/013,500, filed Sep. 4, 2020, which is a continuation of U.S. Ser. No. 16/361,071, filed Mar. 21, 2019, now U.S. Pat. No. 10,771,333, which is a continuation of U.S. Ser. No. 15/787,335, filed on Oct. 18, 2017, now U.S. Pat. No. 10,263,845, which claims the benefit under 35 U.S.C. § 119(e) of the U.S. Provisional Application Ser. No. 62/507,095, filed May 16, 2017, the content of which is hereby incorporated by reference in its entirety.

FIELD OF THE INVENTION

This disclosure relates to approaches for providing continuous configuration deployment.

BACKGROUND

Under conventional approaches, computing systems require routine maintenance for continued operation. For example, a typical computing system may need to install system patches on a weekly basis, and system patches can be quite large (e.g., hundreds of megabytes or several gigabytes). Additionally, computing systems are typically required to be offline during maintenance, so maintenance windows are often limited to a short duration (e.g., 2 hours), which may be insufficient to obtain (e.g., download) and install large system patches. Computing systems may also have varying maintenance requirements (e.g., different computing systems may be running different software versions), which can require a user (e.g., an engineer) to manually configure patches for each deployment.

SUMMARY

Various embodiments of the present disclosure may include systems, methods, and non-transitory computer readable media configured to facilitate providing continuous configuration deployment. A configuration definition object may be obtained over a communication network from a first datastore. The first datastore may comprise a remote datastore. The configuration definition object may be stored in a second datastore (e.g., local datastore). A first configuration object may be generated based on the configuration definition object and one or more system characteristics. A service request may be received. The first configuration object may be executed in response to receiving the service request.

In some embodiments, the configuration definition object may be provided in response to the configuration definition object being committed to the first datastore.

In some embodiments, the remote datastore may be located at a central server or a sub server. In some embodiments, the configuration definition object may be obtained in advance of a scheduled maintenance. In some embodiments, the service request may be received subsequent to obtaining the configuration definition object.

In some embodiments, the configuration definition object may support generation of multiple different configuration objects. In some embodiments, the one or more system characteristics may comprise system version information.

In some embodiments, the systems, methods, and non-transitory computer readable media may be configured to receive a configuration request from a remote system. The configuration request may indicate the configuration definition object. In response to receiving the configuration request, the configuration definition object may be provided to the remote system. The configuration definition object may be capable of facilitating a generation of a second configuration object by the remote system. The second configuration object may be generated based on the configuration definition object and one or more second system characteristics. The second configuration object may be different from the first configuration object.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
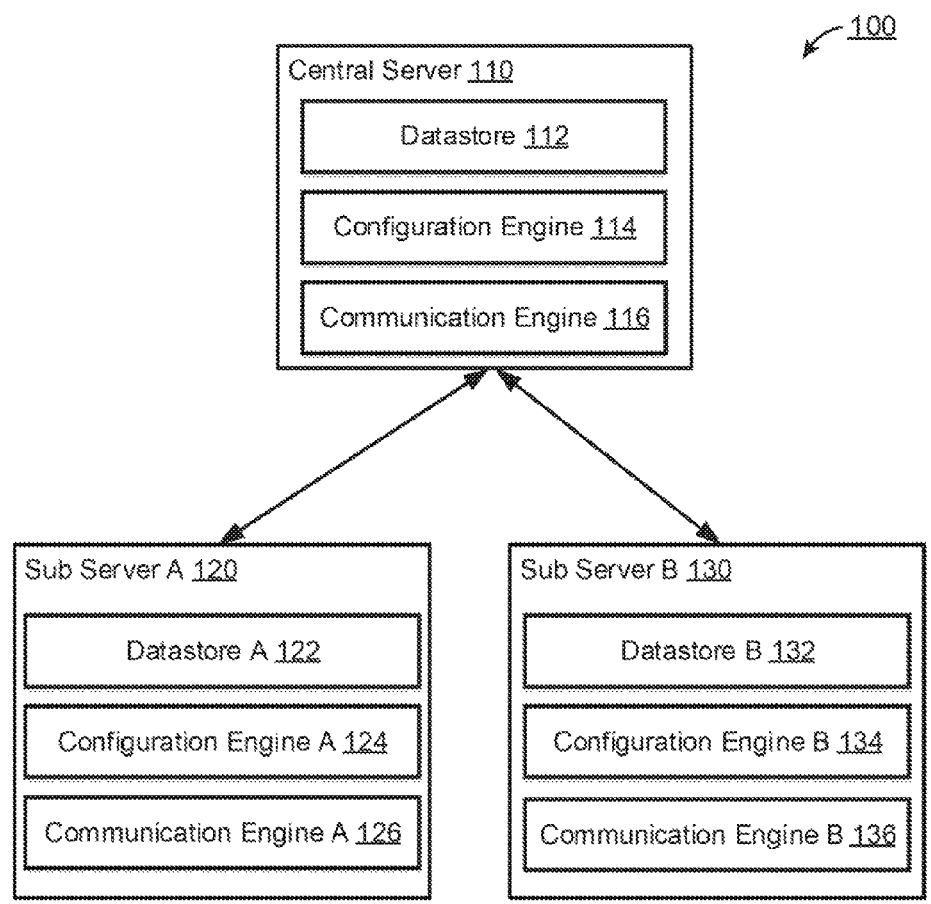
FIG. 1 illustrates an example environment for providing continuous configuration deployment, in accordance with various embodiments.

A claimed solution rooted in computer technology overcomes problems specifically arising in the realm of computer technology. In various implementations, a computing system may obtain a configuration definition object (e.g., files, scripts, binaries or packages) over a communication network from a remote datastore (e.g., a centrally maintained hierarchical data repository, and/or a local cache of a remote system). The configuration definition object may be used to generate different configuration objects (e.g., particular system patches). For example, a single configuration definition object may be used to automatically generate different system patches based on the particular characteristics (e.g., version information) of the different systems. The obtained configuration definition object may be stored in a second datastore (e.g., a local cache). In some embodiments, the configuration definition object may be obtained and stored in advance of a scheduled maintenance, which may reduce the downtime associated with the scheduled maintenance (e.g., by reducing lengthy downloads). In some embodiments, the configuration definition object may be obtained in response to the configuration definition object being committed to the remote datastore, which may help ensure that the systems consistently obtain current updates without a user (e.g., administrator) having to manually request and/or provide updates. A configuration object (e.g., a particular system patch) may be generated from the configuration definition object and one or more system characteristics. A service request (e.g., a system patch request associated with a scheduled maintenance) may be received, and the configuration object may be executed to perform a configuration of a computing system (e.g., without requiring user input).

In some embodiments, the computing system may provide configuration definition objects to one or more remote systems. For example, the computing system may receive a request from a remote system, and determine whether it has an appropriate configuration definition object sufficient to satisfy the request. If it has the configuration definition object, the computing system may provide it to the remote system. If the computing systems does not have the appropriate configuration definition object, it may forward the request to another remote system, which in turn may determine if it has the appropriate configuration object. This process may be repeated until the appropriate configuration definition object is located and/or the request reaches a central server (e.g., a server maintaining the remote datastore). This may help reduce a load on the central server, and may help ensure the remote systems receive updates even under poor network conditions (e.g., the central server goes down, and/or the remote system loses network connectivity with the central server).

The systems and methods disclosed herein enable provision of continuous configuration deployment. A configuration definition object file may be used to generate different configuration objects for different system. The configuration definition object may include hierarchal configurations, which may be used to configure different systems. The configuration definition object may be provided by a central server to one or more remote systems in advance of a scheduled maintenance. By obtaining the configuration definition object from the central server in advance, the remote system(s) may be able to implement the maintenance/configuration without having an active network connection with the central server. By obtaining the configuration definition object from the central server in advance, the remote system(s) may be able to implement the maintenance/configuration without spending time/network resources downloading the necessary file(s) during the maintenance window. This may reduce the time required for maintenance, and may reduce the amount of time a system must be offline for maintenance. A remote system that needs a configuration definition object may request the configuration definition object from another remote system (sub server), rather than requesting the configuration definition object from the central sever. The provision of the configuration definition object may be effectuated by a server application (e.g., Java server application) that sits at different layers. Individual remote systems may compile the configuration definition object(s) for its own purposes and applying the configuration to itself (and/or its nodes). The configuration definition object(s) may be compiled based on the context/environment of the system (e.g., a remote system, a node) to which the configuration will be applied. Such provision/use of the configuration definition objects may allow a network of systems to be centrally defined and de-centrally managed.

FIG. 1 illustrates an example environment 100 for providing continuous configuration deployment, in accordance with various embodiments. The example environment 100 may include a central server 110, a sub server A 120, and a sub server B 130. The central server 110, the sub server A 120, and the sub server B 130 may include one or more processors and memory. The processor(s) may be configured to perform various operations by interpreting machine-readable instructions stored in the memory. The central server 110 may communicate with the sub server A 120 and/or the sub server B 130 via one or more networks. The environment 100 may also include one or more datastores (not shown) that is accessible to the central server 110 and/or one or more of the sub servers 120, 130 via the network(s). In some embodiments, the datastore(s) may include various databases, application functionalities, application/data packages, and/or other data that are available for download, installation, and/or execution.

In various embodiments, the central server 110 may include a datastore 112, a configuration engine 114, and a communication engine 116. The datastore 112 may include structured and/or unstructured sets of data that can be divided/extracted for provision when needed by a component of the environment 100 (e.g., the central server 110, the sub server A 120, the sub server B 130, nodes of the central server 110/the sub servers 120, 130). The datastore 112 may include one or more repositories (e.g., version control repository, Git repository, and/or the like) for storing changes for one or more components of the environment 100. The datastore 112 may include one or more centrally maintained hierarchical data repositories. The datastore 112 may include one or more configuration definition objects, configuration objects, and/or other files to be used by one or more components of the environment 100. The datastore 112 may include different data analysis modules that facilitate different data analysis tasks, patches for the applications/systems, custom application/functionalities built for particular application/systems, and/or other information to be used in the environment 100.

A configuration definition object may define one or more configurations for one or more systems. Configurations for multiple systems may be defined by one or more hierarchical configuration files such that each system does not require separate configuration file(s). A configuration definition object may include one or more files used to compile and/or otherwise generate one or more configuration objects. A configuration object may refer to one or more files for configuring a system. For example, a configuration definition object may include one or more of files, scripts, binaries, packages, and/or other files which may be used to compile one or more configuration objects. For example, a configuration object may include one or more patches/updates to be applied to a particular system (e.g., sub servers, nodes of sub servers). A configuration object may include jobs (e.g., hierarchy of jobs) converted from the configuration definition object. The jobs may be applied by different systems to implement the patch/updates.

A configuration definition object may support generation of multiple different configuration objects. Different configuration objects (e.g., particular system patches) may be generated based on the configuration definition object, relevant system characteristics, and/or other information. For example, a single configuration definition object may be used to automatically generate different system patches based on the particular characteristics of different systems to which the configuration will be applied.

A configuration definition object may be used to apply different implementations of the same underlying configuration to multiple components of the environment 100 (e.g., the central server 110, the sub server A 120, the sub server B 130, nodes of the central server 110/the sub servers 120, 130). For example, a configuration definition object may be used to apply different implementations of the same underlying configuration to multiple servers/sub servers/nodes via patches/updates that takes into account individual system's characteristics. The different implementations may be applied to the different components of the environment 100 based on a hierarchy of configuration in the configuration definition object. The hierarchy of configuration may include a level of files for individual stacks, a level of files for stack types, and a level of files for common files. Other levels and/or arrangement of levels are contemplated.

While the systems and methods are described herein with respect to applying patches/updates to different components of the environment, this is merely as an example and is not limiting. The systems and methods may be used to provide continuous configuration deployment for other purposes, such as for checking stack compliancy, data collection, remote control, authorization/authentication, and/or other continuous configuration deployment.

The configuration engine 114 may be configured to manage one or more configuration definition objects, one or more configuration objects, and/or other files for continuous configuration deployment. In some embodiments, the configuration engine 114 may be implemented as a server application (e.g., Java server application). The configuration engine 114 may receive one or more configuration definition objects. The configuration definition objects may be received from one or more users (e.g., entered by a user) and/or one or more systems (e.g., received from a remote computing system), and/or generated on the central server 110. The configuration engine 114 may be configured to determine when a configuration definition object is committed to the datastore 112 and/or other locations. In some embodiments, the configuration definition object being committed to the datastore 112 may include the configuration definition object being committed to one or more repositories (e.g., version control repository, Git repository) for storing changes for one or more components of the environment 100. In some embodiments, the configuration engine 114 may be configured to commit the configuration definition object to the datastore 112. For example, the configuration engine 114 may continuously and/or periodically integrate configuration definition objects into a version control repository/Git repository in the datastore 112.

The configuration engine 114 may be configured to generate one or more configuration objects based on a configuration definition object, relevant system characteristics, and/or other information. Relevant system characteristics may include characteristics of a system to which the configuration will be applied. Characteristics of a system may include information relating to software and/or hardware of the system. For example, characteristics of a system may include one or more of version information, context, operating environment, identifier (e.g., stack identifier), type (e.g., stack type), and/or other characteristics of the system. For example, based on a configuration to be applied to the sub server A 120 (and/or nodes of the sub server A 120) and the sub server B 130 (and/or nodes of the sub server B 130), the configuration engine 114 may generate different configuration objects based on the configuration definition object and the characteristic(s) of the sub server A 120 (and/or the nodes of the sub server A 120) and the sub server B 130 (and/or the nodes of the sub server B 130), respectively. The configuration object for the sub server A 120 (and/or the nodes of the sub server A 120) may be different from the configuration object for the sub server B 130 (and/or the nodes of the sub server B 130). The configuration object for the sub server A 120 may include a unique combination of configuration(s) contained in the configuration definition object, which may be determined based on the characteristic(s) of the sub server A 120 (and/or the nodes of the sub server A 120). The configuration object for the sub server B 130 may include a unique combination of configuration(s) contained in the configuration definition object, which may be determined based on the characteristic(s) of the sub server B 130 (and/or the nodes of the sub server B 130).

The configuration engine 114 may be configured to execute one or more configuration objects based on a service request. For example, the configuration engine 114 may execute a configuration object for the sub server A 120 based on a service request. A service request may refer to a request by a system to apply a configuration (e.g., a system patch request associated with a scheduled maintenance) to the system or another system. The service request may be entered at the central server 110 and/or may be received from another system (e.g., the sub server A 120). For example, the server request may be received based on execution of a maintenance operation (e.g., scheduled maintenance) at the sub server A 120). Executing the configuration object may apply the configuration in the configuration object to the relevant system (e.g., sub server A 120). Executing the configuration object may include running the configuration object at the central server 110 to apply the configuration and/or providing the configuration object to the relevant system (e.g., sub server A 120) and having the relevant system run the configuration object to apply the configuration.

In some embodiments, a configuration may be applied to a system using one or more definitions/tasks (e.g., API) and one or more programming routines (e.g., handlers) to carry out/perform the definitions/tasks. For example, a configuration object may include one or more APIs and one or more handlers. The API(s) and the handler(s) may be executed on the same machine or on different machines. Execution of a configuration object may include execution of the API(s) and the handler(s) on the same system or on different system. For example, a server application running on the sub server A 120 may run into an API, which requires a handler not present on the sub server A 120. The server application may request handler execution/forwarding from other systems (e.g., the central server 110, the sub server B 130).

The communication engine 116 may be configured to provide one or more configuration definition objects to one or more remote systems (e.g., the sub server A 120, the sub server B 130). The configuration definition object(s) may be provided over one or more communication networks. A configuration definition object may be provided by the communication engine 116 to a remote system in response to a determination that the configuration definition object has been committed to the datastore 112 and/or other locations. In some embodiments, the configuration definition object being committed to the datastore 112 may include the configuration definition object being committed to one or more repositories (e.g., version control repository, Git repository) for storing changes for one or more components of the environment 100. In some embodiments, the communication engine 116 may be implemented as a server application (e.g., Java server application).

For example, in response to a new configuration definition object being integrated into a version control repository/Git repository, the communication engine 116 may provide the configuration definition object to a remote system. This may automate the provision of a configuration definition object to a remote system based on the configuration definition object being committed to the version control repository/Git repository. This automation of configuration definition object provision may help ensure remote systems consistently obtain current updates/patches without a user (e.g., administrator) having to manually request and/or provide updates. This automation of configuration definition object provision may help ensure remote systems consistently obtain current updates/patches in advance of a scheduled maintenance, which may reduce the length of a maintenance operation (e.g., by reducing/eliminating the time needed to download the updates/patches). Reducing the length of the maintenance operation may enable systems to reduce the amount of time the systems are down/offline for maintenance.

The communication engine 116 may be configured to check whether a remote system is capable of receiving the configuration definition object. For example, a remote system may not be able to receive the configuration definition object because the remote system is down, there is no active network connection between the central server 110 and the remote system, and/or the remote system is otherwise occupied. The communication engine 116 may be configured to provide the configuration definition object to the remote system (e.g., the sub server A 120) when the remote system is capable of receiving the configuration definition object. The communication engine 116 may be configured to provide the configuration definition object to another remote system (e.g., the sub server B 130), enabling the remote system (e.g. the sub server A 120) to obtain the configuration definition object from the other remote system rather than the central server 110.

The communication engine 116 may be configured to provide one or more configuration definition objects to one or more remote systems in response to receiving one or more configuration requests from the remote system(s). A configuration request may indicate the configuration definition object (e.g., using identifier, system characteristics, hashing). The communication engine 116 may receive a configuration request from a remote system when the remote system has not previously received the configuration definition object from the central server 110 or another remote system. For example, the communication engine 116 may receive a configuration request from the sub server B 130 based on the sub server B 130 requiring the configuration definition object for a maintenance operation. The sub server B 130 may not have received the configuration definition object from the central server 110 or another remote system (e.g., the sub server A 120).

In some embodiments, the communication engine 116 may be configured to provide one or more configuration objects to one or more remote system (e.g., the sub server A 120, the sub server B 130). The configuration object(s) may be provided to the remote system(s) as part of execution of the configuration object.

In various embodiments, the sub server A 120 may include a datastore A 122, a configuration engine A 124, and a communication engine A 126. In some embodiments, the datastore A 122 may be configured to implement some, or all, of the functionalities of the datastore 112 as described above. In some embodiments, the configuration engine A 124 may be configured to implement some, or all, of the functionalities of the configuration engine 114 as described above. In some embodiments, the communication engine A 126 may be configured to implement some, or all, of the functionalities of the communication engine 116 as described above.

In some embodiments, the sub server A 120 may include/ be connected to one or more nodes (e.g., clients). For example, the sub server A 120 may include/be connected to a first node and a second node. The datastore A 122 may include one or more configuration definition objects, configuration objects, and/or other files to be used by one or more components of the environment 100. For example, the datastore A 122 may include one or more configuration definition objects received from a remote datastore (e.g., the datastore 112, the datastore B 132). The datastore A 122 may provide a local cache for storing information (e.g., configuration definition objects).

The configuration engine A 124 may be configured to manage one or more configuration definition objects, one or more configuration objects, and/or other files for continuous configuration deployment. In some embodiments, the configuration engine A 124 may be implemented as a server application (e.g., Java server application). The configuration engine A 124 may store one or more configuration definition objects from a remote datastore (e.g., the datastore 112, the datastore B 132).

The configuration engine A 124 may be configured to generate one or more configuration objects based on a configuration definition object, relevant system characteristics, and/or other information. For example, based on a configuration to be applied to the sub server A 120, a first node of the sub server A 120, and a second node of the sub server A 120, the configuration engine A 124 may generate different configuration objects based on the configuration definition object and the characteristic(s) of the sub server A 120, first node, and the second node, respectively. The configuration objects for the sub server A 120, the first node, and the second node may individually include a unique combination of configuration(s) contained in the configuration definition object, which may be determined based on the characteristic(s) of the sub server A 120, the first node, and the second node, respectively, and/or other information.

The configuration engine A 124 may be configured to execute one or more configuration objects based on a service request. For example, the configuration engine A 124 may execute a configuration object for the sub server A 120, a first node of the sub server A 120, and/or a second node of the sub server A 120 based on a service request. The service request may be entered at the sub server A 120 and/or may be received from another system (e.g., the first node, the second node). For example, the server request may be received based on execution of a maintenance operation (e.g., scheduled maintenance). Executing the configuration object may apply the configuration in the configuration object to the sub server A 120, the first node, and/or the second node. Executing the configuration object may include running the configuration object at the sub server A 120 to apply the configuration and/or providing the configuration object to the first node and/or the second node and having the first node/second node run the configuration object to apply the configuration. In some embodiments, one or more service requests may be received by the sub server A 120 subsequent to the sub server A 120 having obtained the necessary configuration definition object(s).

The configuration engine A 124 may include and/or receive all automations required to manage itself and/or its nodes with respect to configuration deployment. For example, a configuration definition object obtained from a remote datastore may include a collection of scripts to be applied for a particular configuration. The configuration engine A 124 may include and/or receive all automations required to convert/compile the collection of scripts into a hierarchy of jobs and run the jobs. Such provision/use of the configuration definition objects may allow a network of systems to be centrally defined (e.g., defined by the central server 110) and de-centrally managed (e.g., managed by the sub server A 120).

In some embodiments, a configuration may be applied to a system using one or more definitions/tasks (e.g., API) and one or more programming routines (e.g., handlers) to carry out/perform the definitions/tasks. An API and a handler may be executed on the same machine or on different machines. For example, a server application running on a first node of the sub server A 120 may run into an API, which requires a handler not present on the first node. The server application may request handler execution/forwarding by other systems (e.g., the central server 110, the sub server A 120, the sub server B 130).

The communication engine A 126 may be configured to obtain one or more configuration definition objects from one or more remote datastores (e.g., the datastore 112, the database B 132). The configuration definition object(s) may be obtained by the communication engine A 126 from a remote database in response to a configuration definition object being committed to the remote datastore and/or other locations. In some embodiments, the configuration definition object being committed to the remote datastore may include the configuration definition object being committed to one or more repositories (e.g., version control repository, Git repository) for storing changes for one or more components of the environment 100. In some embodiments, the communication engine A 126 may be implemented as a server application (e.g., Java server application).

For example, in response to a new configuration definition object being integrated into a version control repository/Git repository, the communication engine A 126 may obtain the configuration definition object from a remote database. This may automate the reception of a configuration definition object from the remote database based on the configuration definition object being committed to the version control repository/Git repository. This automation of configuration definition object reception may help ensure that the sub server A 120 consistently obtains current updates/patches without a user (e.g., administrator) having to manually request and/or provide updates. This automation of configuration definition object reception may help ensure that the sub server A 120 consistently obtains current updates/patches in advance of a scheduled maintenance, which may reduce the length of a maintenance operation (e.g., by reducing/eliminating the time needed to download the updates/patches). Reducing the length of the maintenance operation may enable systems to reduce the amount of time the systems are down/offline for maintenance.

The communication engine A 126 may be configured to provide one or more configuration definition objects to one or more remote systems in response to receiving one or more configuration requests from the remote system(s). The communication engine A 126 may receive a configuration request from a remote system when the remote system has not previously received the configuration definition object from the central server 110 or another remote system. For example, the communication engine A 126 may receive a configuration request from the sub server B 130 based on the sub server B 130 requiring the configuration definition object for a maintenance operation. The sub server B 130 may not have received the configuration definition object from the central server 110 or another remote system.

In some embodiments, the communication engine A 126 may be configured to forward one or more configuration requests. The configuration request(s) may be forwarded based on the sub server A 120 not having the configuration definition object indicated by the configuration request. The communication engine A 126 may forward the configuration request(s) to the central server 110 and/or another remote system (e.g., another sub server). In some embodiments, the communication engine A 126 may receive the indicated configuration definition object from the central server 110 and/or another remote system. The indicated configuration definition object may be stored at the datastore A 122. In some embodiments, the indicated configuration definition object may be stored for a set period of time (e.g., temporarily cached). In some embodiments, the indicated configuration definition object may be provided by the central server 110 and/or another remote system(s) to the system that originally sent the configuration request(s), and the communication engine A 126 may not receive the indicated configuration definition object. Forwarding/routing of configuration requests may reduce the load on the central server 110 and/or may help ensure the remote systems (e.g., sub servers, nodes of sub server) to receive updates even under poor network conditions (e.g., the central server 110 goes down, and/or the remote system loses network connectivity with the central server 110).

In some embodiments, the communication engine A 126 may be configured to provide one or more configuration objects to one or more remote system (e.g., the sub server B 130, one or more nodes of the sub server A 120). The configuration object(s) may be provided to the remote system(s) as part of execution of the configuration object.

In various embodiments, the sub server B 130 may include a datastore B 132, a configuration engine B 134, and a communication engine B 136. In some embodiments, the datastore B 132 may be configured to implement some, or all, of the functionalities of the datastore A 122 as described above. In some embodiments, the configuration engine B 134 may be configured to implement some, or all, of the functionalities of the configuration engine A 124 as described above. In some embodiments, the communication engine B 136 may be configured to implement some, or all, of the functionalities of the communication engine A 126 as described above.

In some embodiments, the sub server B 130 may include/be connected to one or more nodes (e.g., clients). For example, the sub server B 130 may include/be connected to a first node and a second node. The datastore B 132 may include one or more configuration definition objects, configuration objects, and/or other files to be used by one or more components of the environment 100. For example, the datastore B 132 may include one or more configuration definition objects received from a remote datastore (e.g., the datastore 112, the datastore A 122). The datastore B 132 may provide a local cache for storing information (e.g., configuration definition objects).

The configuration engine B 134 may be configured to manage one or more configuration definition objects, one or more configuration objects, and/or other files for continuous configuration deployment. In some embodiments, the configuration engine B 134 may be implemented as a server application (e.g., Java server application). The configuration engine B 134 may store one or more configuration definition objects from a remote datastore (e.g., the datastore 112, the datastore A 122).

The configuration engine B 134 may be configured to generate one or more configuration objects based on a configuration definition object, relevant system characteristics, and/or other information. For example, based on a configuration to be applied to the sub server B 130, a first node of the sub server B 130, and a second node of the sub server B 130, the configuration engine B 134 may generate different configuration objects based on the configuration definition object and the characteristic(s) of the sub server B 130, first node, and the second node, respectively.

The configuration engine B 134 may be configured to execute one or more configuration objects based on a service request. For example, the configuration engine B 134 may execute a configuration object for the sub server B 130, a first node of the sub server B 130, and/or a second node of the sub server B 130 based on a service request. Executing the configuration object may apply the configuration in the configuration object to the sub server B 130, the first node, and/or the second node. Executing the configuration object may include running the configuration object at the sub server B 120 to apply the configuration and/or providing the configuration object to the first node and/or the second node and having the first node/second node run the configuration object to apply the configuration. The configuration engine B 134 may include and/or receive all automations required to manage itself and/or its nodes. These automations may allow a network of systems to be centrally defined (e.g., defined by the central server 110) and de-centrally managed (e.g., managed by the sub server B 130). In some embodiments, a configuration may be applied to a system using one or more definitions/tasks (e.g., API) and one or more programming routines (e.g., handlers) to carry out/perform the definitions/tasks. Execution of the configuration object may include execution of the API(s) and the handler(s) on the same system or on different system.

The communication engine B 136 may be configured to obtain one or more configuration definition objects from one or more remote datastores (e.g., the datastore 112, the database A 122). The configuration definition object(s) may be obtained by the communication engine B 136 from a remote database in response to a configuration definition object being committed to the remote datastore/repositor(ies) and/or other locations. In some embodiments, the communication engine B 136 may be implemented as a server application (e.g., Java server application).

The communication engine B 136 may be configured to provide one or more configuration definition objects to one or more remote systems in response to receiving one or more configuration requests from the remote system(s). The communication engine B 136 may receive a configuration request from a remote system when the remote system has not previously received the configuration definition object from the central server 110 or another remote system. For example, the communication engine B 136 may receive a configuration request from the sub server A 120 based on the sub server A 120 requiring the configuration definition object for a maintenance operation. In some embodiments, the communication engine B 136 may be configured to forward one or more configuration requests based on the sub server B 130 not having the configuration definition object indicated by the configuration request.

In some embodiments, the communication engine B 136 may be configured to provide one or more configuration objects to one or more remote system (e.g., the sub server A 120, one or more nodes of the sub server B 130). The configuration object(s) may be provided to the remote system(s) as part of execution of the configuration object.

Figure 2:
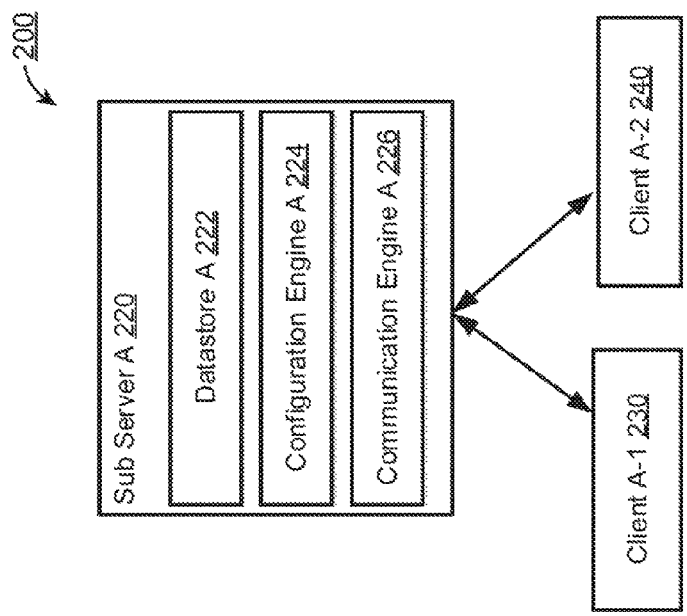
FIG. 2 illustrates an example environment for providing continuous configuration deployment, in accordance with various embodiments.

FIG. 2 illustrates an example environment 200 for providing continuous configuration deployment, in accordance with various embodiments. The example environment 200 may include a sub server A 220, a client A-1 230, and a client A-2 240. The sub server A 220, the client A-1 230, and the client A-2 240 may include one or more processors and memory. The processor(s) may be configured to perform various operations by interpreting machine-readable instructions stored in the memory. In some embodiments, the sub server A 220 may be configured to implement some, or all, of the functionalities of the sub server A 120 as described above.

Prior to the example environment 200 shown in FIG. 2, the sub server A 220 may have received one or more configuration definition objects from a remote datastore (e.g., data store 112, datastore B 132) as described above with respect to the sub server A 120. The configuration definition object(s) may be stored in the datastore A 222. In some embodiments, the datastore A 222 may be configured to implement some, or all, of the functionalities of the datastore A 122. In some embodiments, the configuration engine A 224 may be configured to implement some, or all, of the functionalities of the configuration engine A 124 as described above. In some embodiments, the communication engine A 226 may be configured to implement some, or all, of the functionalities of the communication engine A 126 as described above.

The configuration engine A 224 may be configured to manage one or more configuration definition objects, one or more configuration objects, and/or other files for continuous configuration deployment. In some embodiments, the configuration engine A 224 may be implemented as a server application (e.g., Java server application).

The configuration engine A 224 may be configured to generate one or more configuration objects based on a configuration definition object, relevant system characteristics, and/or other information. For example, based on a configuration to be applied to the sub server A 220, the client A-1 230, and the client A-2 240, the configuration engine A 224 may generate different configuration objects based on the configuration definition object and the characteristic(s) of the sub server A 220, the client A-1 230, and the client A-2 240, respectively.

The configuration engine A 224 may be configured to execute one or more configuration objects based on a service request. For example, the configuration engine A 224 may execute a configuration object for the sub server A 220, the client A-1 230, and/or the client A-2 240 based on a service request. Executing the configuration object may apply the configuration in the configuration object to the sub server A 220, the client A-1 230, and/or the client A-2 240. Executing the configuration object may include running the configuration object at the sub server A 220 to apply the configuration and/or providing the configuration object to the client A-1 230 and/or the client A-2 240 and having the clients 230, 240 run the configuration object to apply the configuration. Obtaining the configuration definition object for the sub server A 220, the client A-1 230, and/or the client A-2 240 in advance of the configuration object execution may allow the sub server A 220 to apply configuration to the sub server A 220, the client A-1 230, and/or the client A-2 240 without having connection to and/or without downloading the configuration definition object from a server (e.g., the central server 110, the sub server B 130).

The communication engine A 226 may be configured to provide one or more configuration definition objects to one or more remote systems in response to receiving one or more configuration requests from the remote system(s). In some embodiments, the communication engine A 226 may be configured to forward one or more configuration requests (e.g., to another remote system). In some embodiments, the communication engine A 226 may be configured to provide one or more configuration objects to one or more remote system (e.g., the client A-1 230, the client A-2 240). The configuration object(s) may be provided to the remote system(s) as part of execution of the configuration object.

Figure 3:
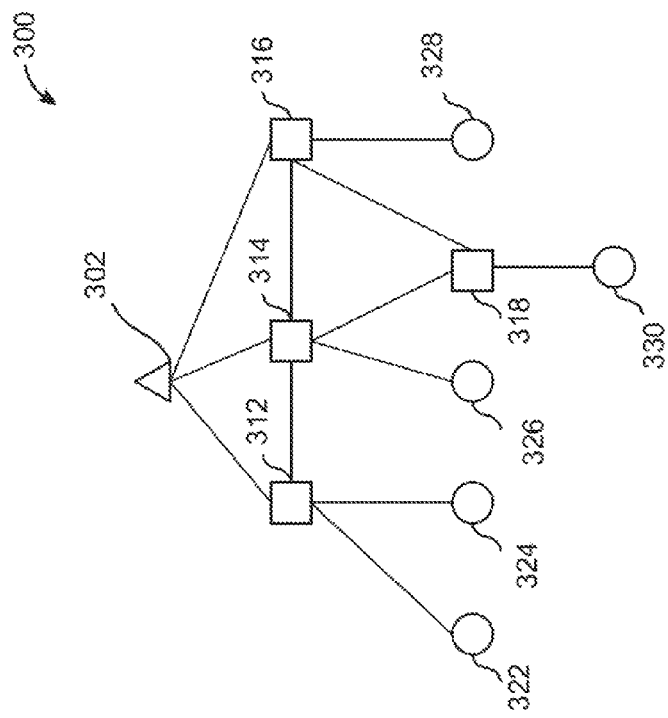
FIG. 3 illustrates an example environment for providing continuous configuration deployment, in accordance with various embodiments.

FIG. 3 illustrates an example environment 300 for providing continuous configuration deployment, in accordance with various embodiments. The example environment 300 may include a central server 302, a sub server A 312, a sub server B 314, a sub server C 316, a sub server D 318, a client A 322, a client B 324, a client C 326, a client D 328, and a client E 330. The central server 302, the sub servers 312, 314, 316, 318, and the clients 322, 324, 326, 328, 330 may include one or more processors and memory. The processor(s) may be configured to perform various operations by interpreting machine-readable instructions stored in the memory.

In some embodiments, the central server 302 may be configured to implement some, or all, of the functionalities of the central server 110 as described above. In some embodiments, the sub servers 312, 314, 316, 318 may be configured to implement some, or all, of the functionalities of the sub servers 120, 130, 220 as described above. In some embodiments, the clients 322, 324, 326, 328, 330 may be configured to implement some, or all, of the functionalities of the clients 230, 240 as described above. The central server 302 and/or one or more of the sub servers 312, 314, 316, 318 may provide data/processing for operation of one or more of the clients 322, 324, 326, 328, 330. The network of connections among the central server 302, the sub servers 312, 314, 316, 318, and the clients 322, 324, 326, 328, 330 may form a mesh.

Configuration deployment on one or more of the sub servers 312, 314, 316, 318, and the clients 322, 324, 326, 328, 330 may require one or more configuration definition objects. The configuration definition objects may be centrally stored/generated at the central server 302. Having too many of the sub servers 312, 314, 316, 318, and/or the clients 322, 324, 326, 328, 330 attempting to contact the central server 302 at/near the same time for the relevant configuration definition object may overwhelm the central server 302 and/or may lead to conflicts/loss of messages between the systems. Rather than waiting until for requests of the configuration definition object(s) by the sub servers 312, 314, 316, 318, and/or the clients 322, 324, 326, 328, 330, the central server 302 may provide (e.g., push) the configuration definition objects to one or more of the sub servers 312, 314, 316, 318 (e.g., when the configuration definition object is committed to a datastore/repository). The sub servers 312, 314, 316, 318 may cache the configuration definition object in a local datastore for use when the configuration is applied (e.g., during a scheduled maintenance).

When an operation is performed to apply a particular configuration to a system, a check may be performed to see if it has the necessary configuration definition object/configuration object. For example, when an operation is performed to apply a particular configuration to the client 330, a check may be performed to see if the sub server 318 has the necessary configuration object and/or the necessary configuration definition object to generate the configuration object. If the necessary file(s) are not located at the sub server 318, the request for the file(s) may be forwarded to other systems in the environment 300. For example, the request for the file(s) may be forwarded to the sub servers 314, 316. If the sub servers 314, 316 do not have the necessary file(s), they may forward the request to other systems (e.g., the central server 302, the sub server 312). The system with the necessary file(s) may respond to the request by sending the file(s) to the sub server 318. The route taken by the file(s) may include the most direct route (e.g., fastest path, path with least number of nodes) or may include the path taken by the request (e.g., retracing the path taken by the request). In some implementations, one or more intermediate sub servers (sub servers between the system with the necessary file(s) and the sub server 318) may cache the file(s) locally (for a period of time). Caching the file(s) may allow the intermediate sub servers to respond to future request for the file(s) from another system. For example, subsequent to caching the file(s) in its local datastore, the sub server 314 may receive a request for the same file(s) from the client 326. Because it has cached the file(s), the sub server 314 may respond to the request from the client 326.

Routing/forwarding of requests for file(s) may enable the environment 300 to avoid overwhelming the central server 302 with the same request and provide for scalability in providing continuous configuration deployment. For example, the sub server 312 may include/be connected to the clients 322, 324. The sub server 312 may request and receive from the central server 302 a particular configuration definition object needed to apply a particular configuration to the client 322. The sub server 312 may cache the particular configuration definition object in its local datastore, allowing the sub server 312 to use the cached configuration definition object to apply the particular configuration to not just the client 322, but also the client 324 during its maintenance window.

Routing/forwarding of requests for file(s) may enable the environment 300 to operate when the central server 302 and/or some of the sub servers 312, 314, 316, 318 are down, or when one or more connections between the systems are down. Routing and caching of configuration definition objects among different systems of the environment 300 may prevent one of the systems (e.g., the central server 302) and/or certain connections from becoming a critical infrastructure. For example, even if the central server 302 is down/a connection to the central server 302 is down, a sub server (e.g., the sub server 316) may be able to located the necessary configuration definition object from another sub server (e.g., the sub server 312) that has cached the configuration definition object.

Figure 4:
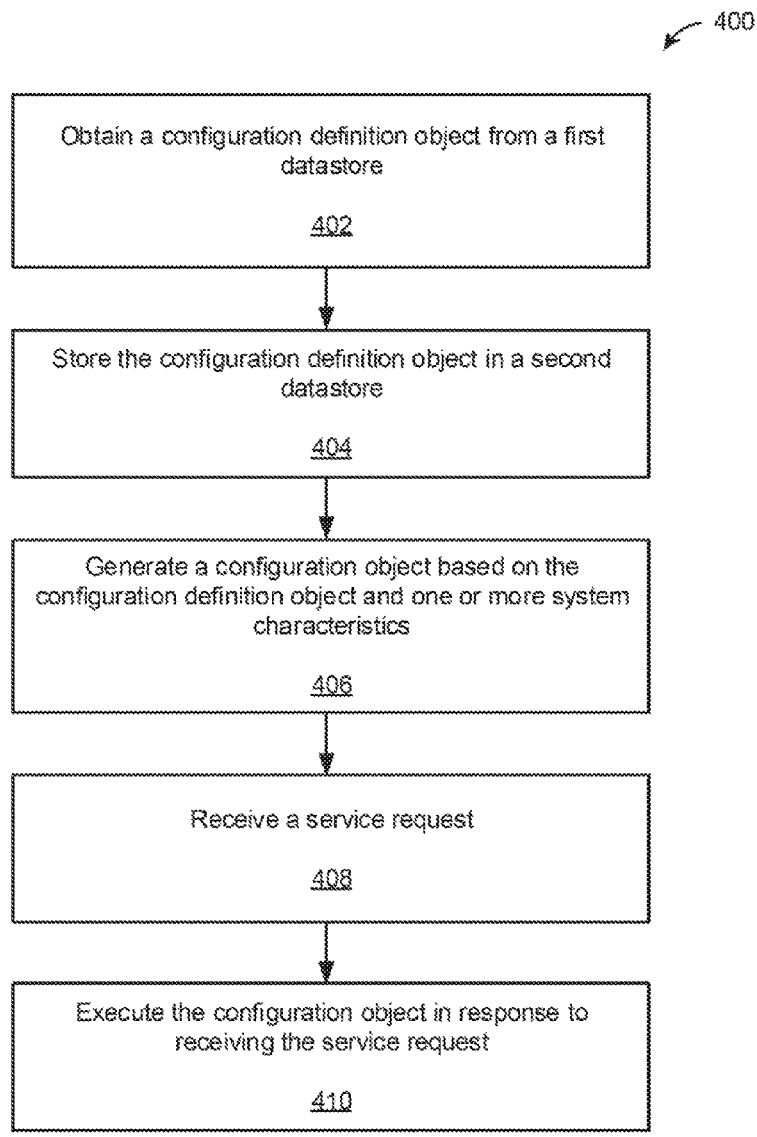
FIG. 4 illustrates a flowchart of an example method, in accordance with various embodiments.

FIG. 4 illustrates a flowchart of an example method 400, according to various embodiments of the present disclosure. The method 400 may be implemented in various environments including, for example, the environment 100 of FIG. 1. The operations of method 400 presented below are intended to be illustrative. Depending on the implementation, the example method 400 may include additional, fewer, or alternative steps performed in various orders or in parallel. The example method 400 may be implemented in various computing systems or devices including one or more processors.

At block 402, a configuration definition object may be obtained from a first datastore. The first datastore may comprise a remote datastore. At block 404, the configuration definition object may be stored in a second datastore. The second datastore may comprise a local datastore. At block 406, a configuration object may be generated based on the configuration definition object and one or more system characteristics. At block 408, a service request may be received. At block 410, the configuration object may be executed in response to receiving the service request.

Figure 5:
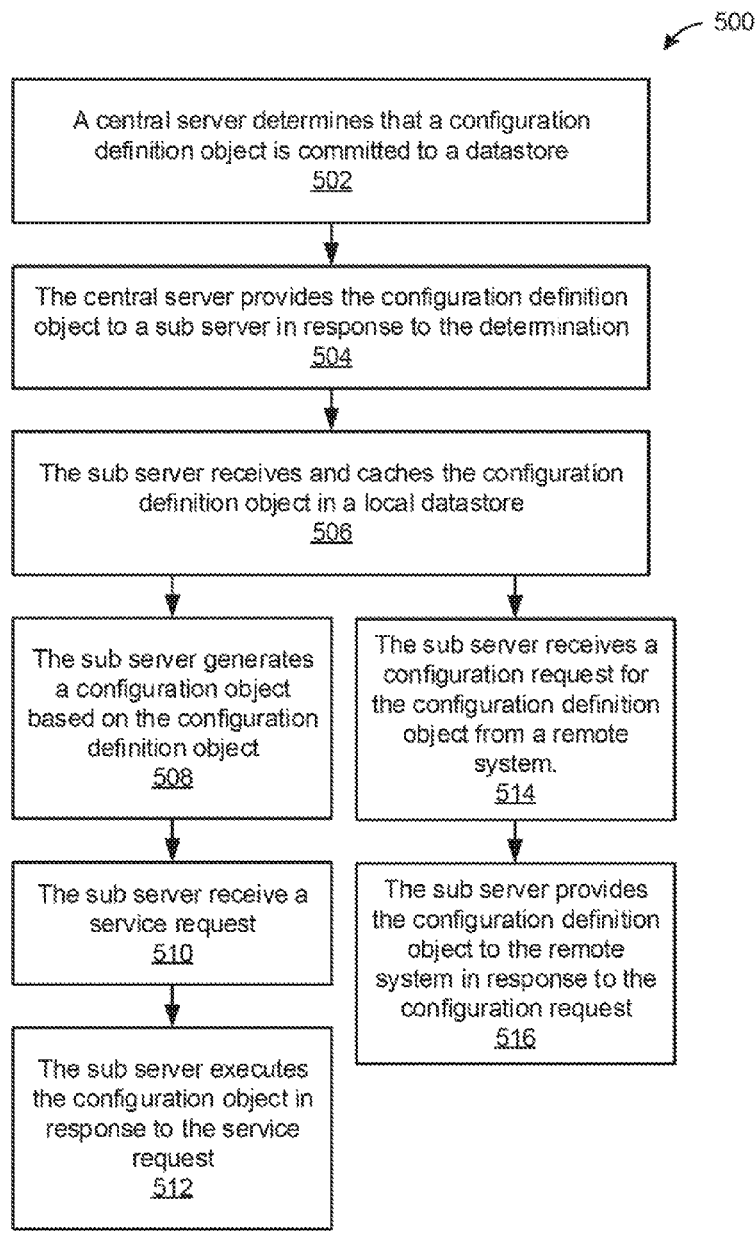
FIG. 5 illustrates a flowchart of an example method, in accordance with various embodiments.

FIG. 5 illustrates a flowchart of an example method 500, according to various embodiments of the present disclosure. The method 500 may be implemented in various environments including, for example, the environment 100 of FIG. 1. The operations of method 500 presented below are intended to be illustrative. Depending on the implementation, the example method 500 may include additional, fewer, or alternative steps performed in various orders or in parallel. The example method 500 may be implemented in various computing systems or devices including one or more processors.

At block 502, a central server may determine that a configuration definition object is committed to a datastore. At block 504, the central server may provide (e.g., push) the configuration definition object to a sub server in response to the determination. At block 506, the sub server may receive and cache the configuration definition object in a local datastore. At block 508, the sub server may generate a configuration object based on the configuration definition object. At block 510, the sub server may receive a service request. At block 512, the sub server may execute the configuration object in response to the service request. At block 514, the sub server may receive a configuration request for the configuration definition object from a remote system. At block 516, the sub server may provide (e.g., forward) the configuration definition object to the remote system in response to the configuration request.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hardwired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
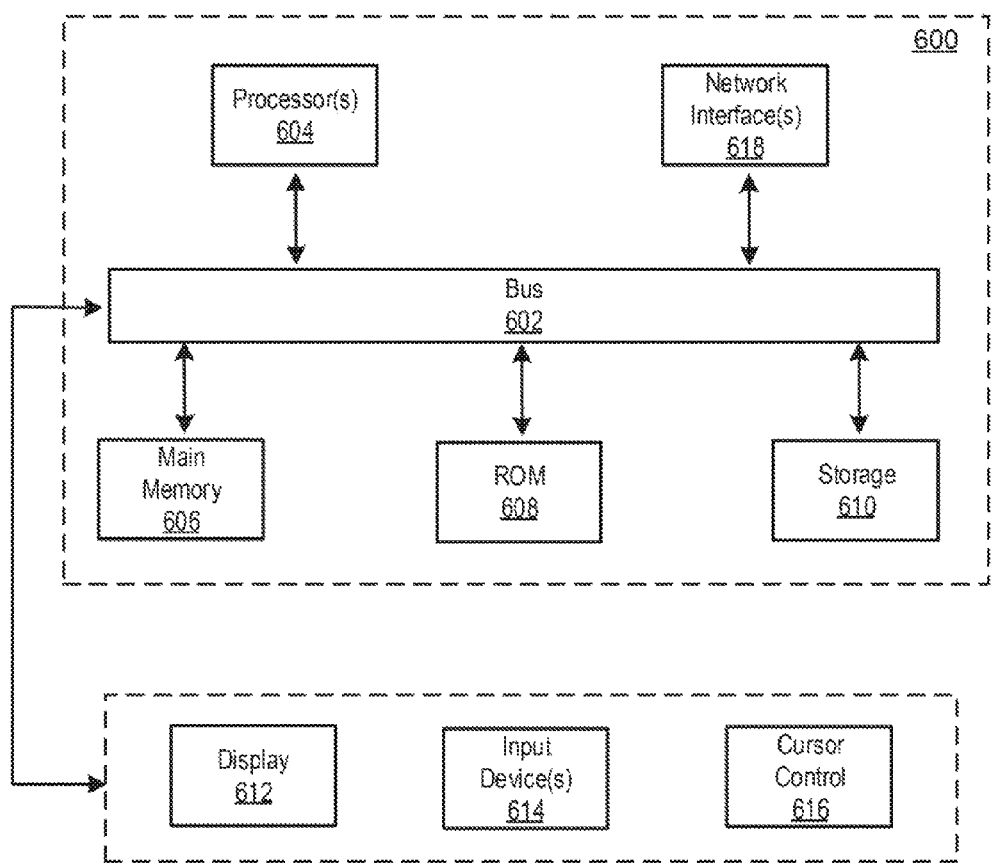
FIG. 6 illustrates a block diagram of an example computer system in which any of the embodiments described herein may be implemented.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A server system comprising:
one or more processors; and
memory storing instructions that, when executed by the one or more processors, cause the server system to perform:
receiving, over a communication network, a configuration request for a configuration definition object from a first remote server, wherein the configuration definition object is configured to generate one or more configuration objects, the configuration objects comprising one or more application programming interfaces (APIs), the configuration objects permitting, upon execution by the one or more processors, checking of stack compliancy, remote controlling, authorization or authentication;
determining whether the configuration definition object is stored in a datastore of the server system;
in response to determining that the configuration definition object is not stored in the datastore, receiving the configuration definition object from a second remote server;
in response to receiving the configuration definition object from the second remote server, determining whether the server system comprises a handler compatible with the one or more APIs; and
in response to determining that the server system is missing the handler, requesting the handler or execution of the handler from the second remote server, a third remote server, or a central server.

2. The server system of claim 1, wherein:
the receiving of the configuration definition object is over a path comprising one or more intermediate sub servers traversing the path between the second remote server and the first remote server, and
the configuration definition object is cached at an intermediate sub server of the one or more intermediate sub servers traversing the path.

3. The server system of claim 2, wherein the instructions further cause the server system to perform:
in response to receiving the configuration definition object from the second remote server, temporarily caching the configuration definition object within the datastore;
receiving a second configuration request for the configuration definition object from the third remote server; and
provisioning the configuration definition object to the third remote server.

4. The server system of claim 3, wherein the instructions further cause the server system to perform:
in response to temporarily caching the configuration definition object within the datastore, committing the configuration definition object to one or more repositories within the datastore, and wherein the provisioning of the configuration definition object is automatic in response to committing the configuration definition object.

5. The server system of claim 4, wherein the one or more repositories comprise a version control repository that stores different versions of the configuration definition object.

6. The server system of claim 1, wherein the configuration definition object comprises files, scripts, and binaries.

7. The server system of claim 1, wherein the receiving of the configuration definition object from the second remote server comprises:
receiving the configuration definition object from a central server if the central server is operational and a connection between the server system and the central server is operational; and
receiving the configuration definition object from the third remote server if the central server is down or if the connection between the server system and the central server is lost.

8. The server system of claim 1, wherein the configuration definition object generates different configuration objects based on one or more characteristics of a node to which a configuration is to be applied.

9. A method implemented by a server system including one or more processors and storage media storing machine-readable instructions, wherein the method is performed using the one or more processors, the method comprising:
receiving, over a communication network, a configuration request for a configuration definition object from a first remote server, wherein the configuration definition object is configured to generate one or more configuration objects, the configuration objects comprising one or more application programming interfaces (APIs), the configuration objects permitting, upon execution by the one or more processors, checking of stack compliancy, remote controlling, authorization or authentication;
determining whether the configuration definition object is stored in a datastore of the server system;
in response to determining that the configuration definition object is not stored in the datastore, receiving the configuration definition object from a second remote server;
in response to receiving the configuration definition object from the second remote server, determining whether the server system comprises a handler compatible with the one or more APIs; and
in response to determining that the server system is missing the handler, requesting the handler or execution of the handler from the second remote server, a third remote server, or a central server.

10. The method of claim 9, wherein:
the receiving of the configuration definition object is over a path comprising one or more intermediate sub servers traversing the path between the second remote server and the first remote server, and
the configuration definition object is cached at an intermediate sub server of the one or more intermediate sub servers traversing the path.

11. The method of claim 10, wherein the method further comprises:
in response to receiving the configuration definition object from the second remote server, temporarily caching the configuration definition object within the datastore;
receiving a second configuration request for the configuration definition object from the third remote server; and
provisioning the configuration definition object to the third remote server.

12. The method of claim 11, further comprising:
in response to temporarily caching the configuration definition object within the datastore, committing the configuration definition object to one or more repositories within the datastore, and wherein the provisioning of the configuration definition object is automatic in response to committing the configuration definition object.

13. The method of claim 12, wherein the one or more repositories comprise a version control repository that stores different versions of the configuration definition object.

14. The method of claim 12, wherein the configuration definition object comprises files, scripts, and binaries.

15. The method of claim 12, wherein the receiving of the configuration definition object from the second remote server comprises:
  receiving the configuration definition object from a central server if the central server is operational and a connection between the server system and the central server is operational; and
  receiving the configuration definition object from the third remote server if the central server is down or if the connection between the server system and the central server is lost.

16. A non-transitory computer-readable medium of a server system storing a set of instructions that, when executed by one or more processors of the server system, cause the server system to perform a method comprising:
  receiving, over a communication network, a configuration request for a configuration definition object from a first remote server, wherein the configuration definition object is configured to generate one or more configuration objects, the configuration objects comprising one or more application programming interfaces (APIs), the configuration objects permitting, upon execution by the one or more processors, checking of stack compliancy, remote controlling, authorization or authentication;
  determining whether the configuration definition object is stored in a datastore of the server system;
  in response to determining that the configuration definition object is not stored in the datastore, receiving the configuration definition object from a second remote server;
  in response to receiving the configuration definition object from the second remote server, determining whether the server system comprises a handler compatible with the one or more APIs; and
  in response to determining that the server system is missing the handler, requesting the handler or execution of the handler from the second remote server, a third remote server, or a central server.

17. The non-transitory computer-readable medium of claim 16, wherein:
  the receiving of the configuration definition object is over a path comprising one or more intermediate sub servers traversing the path between the second remote server and the first remote server, and
  the configuration definition object is cached at an intermediate sub server of the one or more intermediate sub servers traversing the path.

18. The non-transitory computer-readable medium of claim 17, wherein the method further comprises:
  in response to receiving the configuration definition object from the second remote server, temporarily caching the configuration definition object within the datastore;
  receiving a second configuration request for the configuration definition object from the third remote server; and
  provisioning the configuration definition object to the third remote server.

19. The non-transitory computer-readable medium of claim 18, wherein the method further comprises:
  in response to temporarily caching the configuration definition object within the datastore, committing the configuration definition object to one or more repositories within the datastore, and wherein the provisioning of the configuration definition object is automatic in response to committing the configuration definition object.

20. The non-transitory computer-readable medium of claim 16, wherein the receiving of the configuration definition object from a different server comprises:
  receiving the configuration definition object from a central server if the central server is operational and a connection between the server system and the central server is operation; and
  receiving the configuration definition object from a second remote server if the central server is down or if the connection between the server system and the central server is lost.

* * * * *